Feb. 7, 1950  J. MERCIER  2,496,952
SHOCK ABSORBER
Filed Jan. 23, 1946  4 Sheets-Sheet 1

INVENTOR:
JEAN MERCIER,
BY Anton Middleton
ATTORNEY

Feb. 7, 1950  J. MERCIER  2,496,952
SHOCK ABSORBER
Filed Jan. 23, 1946  4 Sheets-Sheet 2

INVENTOR:
JEAN MERCIER,
BY Arthur Middleton
ATTORNEY

Feb. 7, 1950    J. MERCIER    2,496,952
SHOCK ABSORBER

Filed Jan. 23, 1946    4 Sheets-Sheet 3

*INVENTOR:*
JEAN MERCIER,
BY Arthur Middleton
ATTORNEY

INVENTOR:
JEAN MERCIER,

Patented Feb. 7, 1950

2,496,952

UNITED STATES PATENT OFFICE 2,496,952

SHOCK ABSORBER

Jean Mercier, New York, N. Y.

Application January 23, 1946, Serial No. 642,925

9 Claims. (Cl. 188—88)

This invention relates to hydraulic astatic shock absorbers or damping devices for use in both mobile and motile types of vehicles as well as in stationary machines where shock or vibration is encountered. More particularly, the invention revolves about an absorber having a working cylinder in which a piston or equivalent sliding member reciprocates both to and from an equilibrium or neutral position in the cylinder, wherein the snubbing effect of the moving piston is automatically variable.

One object of this invention is to provide such an absorber wherein the piston offers little or no resistance on its shock-initiated stroke but which during its return stroke offers snubbing and this resistance is variable in that it is greatest at the instant of change of direction of the piston and decreases proportionally as the piston approaches its neutral position in its working cylinder. In shock absorbers for automobiles, the neutral position is usually the median position.

This invention involves a shock absorber in which a piston or sliding member in its oil-filled working cylinder is subjected at each of its opposite ends or faces to the action of a spring alternately compressed and expanded by the relative displacement of the piston. That is, there are two independent springs, with one spring associated with each face of the piston. These springs cooperate with independent valve means for each face of the piston and are adapted to close and to open oil passageways through the piston in such a manner that except while the piston is in neutral position, one passageway is closed when the other is open, and vice versa. A reservoir of oil or other hydraulic liquid is provided in association with the cylinder, and oil passageways are provided for the controlled flow of oil alternately to and fro between the cylinder and reservoir for the purpose of compensating for leakage resulting from the varying displacement of the sliding member or piston in its working cylinder as well as for thermal expansion of the oil. More specifically, the piston is provided with a valve arrangement for permitting oil to flow by displacement through the piston in a direction opposite to the movement of the piston under conditions that the valve arrangement operates against a variable spring pressure that is greatest when the piston is farthest from its neutral position and decreases as the piston approaches its neutral position. Hence there is provided a pair of independent opposedly disposed valve-controlling coil springs, one spring at each side of the piston.

A further object is to provide means for passing oil to and from the reservoir to the working cylinder as the piston moves toward and away from its neutral position with such means controlled by suitable valve arrangements.

Another object of the invention is to provide means for minimizing oil leakage along the piston rod where it passes through the bearing at the upper end of the working cylinder. Whatever oil may seep therealong inadvertently is taken care of by returning it to the oil reservoir outside of the working cylinder but inside of the outer cylinder.

Another object of the invention is to provide compensating means for the presence or absence of the piston rod below the neutral line or position of the piston. That is, as the piston rod enters the lower position, there must be some compensation for the volume thereof that naturally displaces an equal volume of oil. This compensation must not interfere with the snubbing action which, as has been said before, is variable proportionally to the distance that the piston is away from its neutral or equilibrium position while at the same time allowing the piston rather free or unresisted action on its shock-initiated stroke and only to be snubbed on its return or rebound stroke.

A still further object is embodied in the design of the piston to have lips or flanges upstanding therefrom offering increased friction against the cylinder walls and thus providing additional snubbing action. Other objects will appear as this specification proceeds.

The invention is illustrated in the accompanying drawings which show a preferred embodiment of the invention that is the best known to me at the present. However, this embodiment is shown for illustrative purposes only for obviously the invention is capable of modifications especially as to details, so long as they fall within the ambit of the appended claims.

The invention possesses other objects and features of advantage, some of which with the foregoing will be set forth in the following description. In the following description and in the claims, parts will be identified by specific names for convenience, but they are intended to be as generic in their application to similar parts as the art will permit. In the accompanying drawings there has been illustrated the best embodiment of the invention known to me, but such embodiment is to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings in which Fig. 1 is a longitudinal sectional view of the shock absorber with the piston in its neutral position and both valve control springs substantially equally untensioned;

Fig. 1ᵃ represents a modified structural detail of the shock absorber shown in Fig. 1;

Fig. 1ᵇ is a cross-section taken along line 1ᵇ—1ᵇ in Fig. 1;

Fig. 1ᶜ shows an inflow check valve disc member;

Referring to the latter figure first, the operation of the shock absorber is defined in the co-ordinate system by the piston travel being measured on the abscissa while the hydraulic resistance pressure encountered by the piston is measured on the ordinate.

A complete, that is a two-way, operating cycle of the shock absorber comprises a shock impulse in an upward direction whereby the shock absorber structure as a whole is foreshortened or contracted and a shock impulse in the opposite or downward direction whereby the shock absorber structure is extended, both impulses being assumed to start from a neutral condition of the shock absorber such as corresponds to the intermediate position of the piston.

Hence a tentative travel-pressure diagram of a complete two-way operating cycle in the co-ordinate system comprises the shock-initiated horizontal line a—b of substantially unsnubbed piston travel from the intermediate or neutral point O to the point T on the abscissa against a constant pressure of only about 25#, the point T corresponding to the topmost position of the extension stroke. With the return of the piston to point O an abrupt pressure rise to about 600# is encountered by the piston as defined by point c of a downwardly inclined line c—d of snubbed piston travel, this line indicating that the pressure being encountered by the piston drops in proportion to the distance travelled by the piston on its return stroke towards the neutral point O, the line being shown to terminate at about 150# pressure as represented by point d.

Then follows the shock-initiated contraction stroke of the piston as represented by the horizontal line d—e of substantially unsnubbed piston travel against about 150# of constant pressure, the piston reaching its lowermost position at a point corresponding to point L on the abscissa. As the piston returns from its lowermost position L on the abscissa the hydraulic pressure encountered by the piston again rises abruptly to about 600# as indicated by the initial point f of an inclined line f—a, the rate of incline indicating that the pressure decreases substantially in proportion to the distance travelled by the piston back towards the neutral point O.

Figure 8:
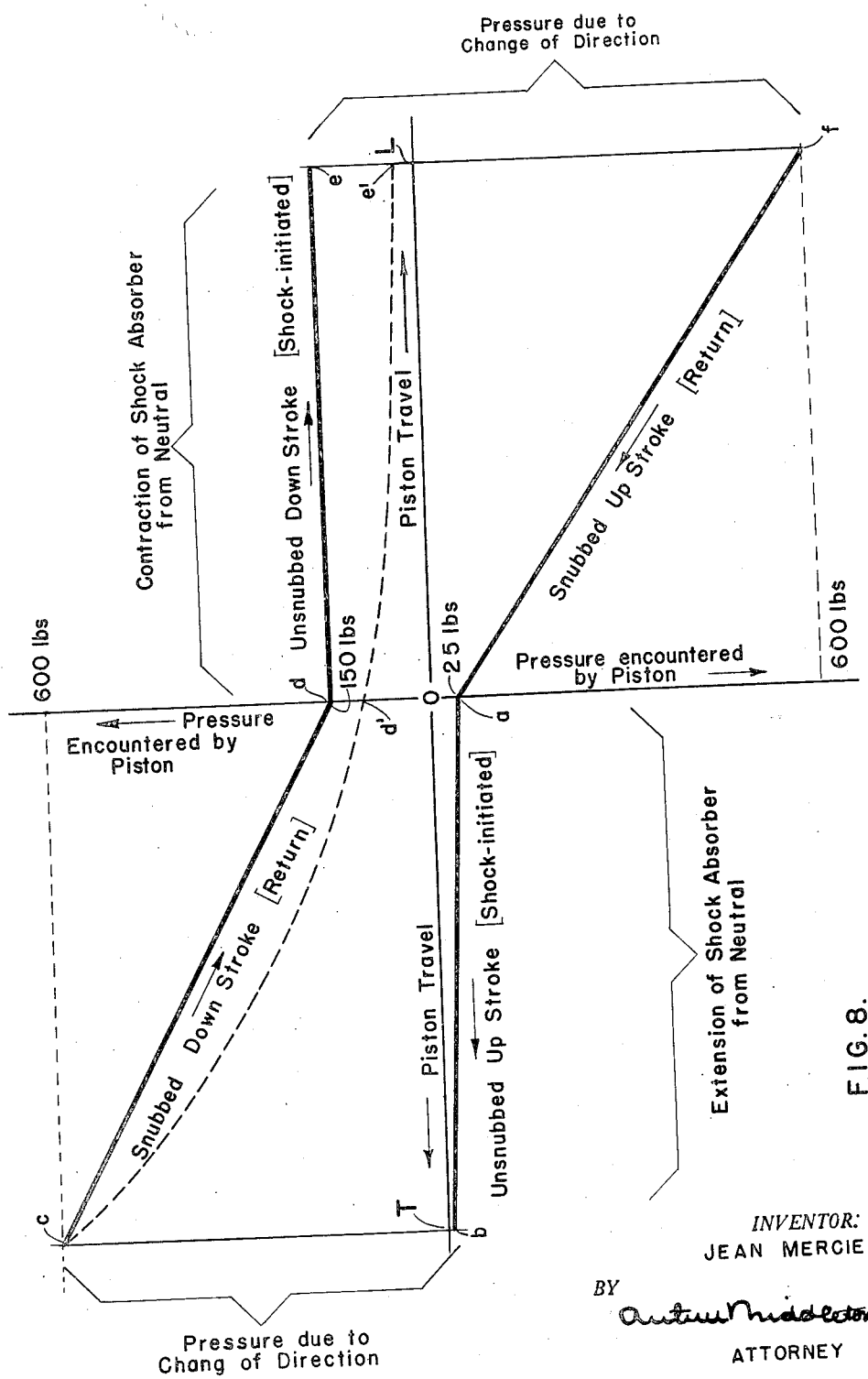
Fig. 8 shows a co-ordinate system in which the operation of the shock absorber is plotted in terms of piston travel as against the hydraulic resistance pressure encountered by the piston.

It will thus be understood that the left half of the Fig. 8 diagram, that is the portion to the left of the vertical main axis of the diagram, represents the extension of the shock-absorber structure during an up and down stroke of the piston, while the opposite half of the diagram to the right of the vertical main axis thereof represents the contraction or foreshortening of the shock absorber structure during a sequence of down and up strokes of the piston from the neutral point O.

The shock absorber comprises a top end portion 10 provided with a horizontal bushing 11 whereby it is attachable in an articulated fashion to the body or chassis construction of a vehicle and a bottom end portion or base 12 provided with a bushing 13 whereby it is attachable in an articulated fashion to the supporting wheel construction of the vehicle.

Fixed to the top end portion 10 as by screws 14 is a cylindrical shield or skirt portion 15 as well as a piston rod or other piston-motivating element 16 concentric with the skirt portion, the upper end of the rod having a thread 17 whereby the rod is screwed into and fastened to the top end portion 10. The lower end portion of the rod carries a piston or equivalent sliding member 18 consisting of a horizontal body or disc portion 19 formed marginally with a rim portion 20 comprising a downwardly extending rim portion or annular lip 20ᵃ and a similar upwardly extending rim portion or annular lip 20ᵇ, these rim portions forming respective lower and upper cup-shaped depressions 21ᵃ and 21ᵇ upon the piston.

The disc portion of the piston has a set of one-way downflow passages 22 and staggered therewith a set of upflow passages 23 in the nature of ball-check or other reciprocable valves 23ᵃ. The piston is mounted upon a reduced end portion 24 of the piston rod, being defined by a shoulder 25. The piston is confined in fixed position upon the piston rod as between an upper spacer sleeve 26 and a lower spacer sleeve 27. The upper sleeve 26 in turn is spaced from the shoulder 25 by a sleeve 28 of larger diameter and therefore forming a shoulder 29 with the spacer sleeve 26. The lower spacer sleeve 27 in turn is confined at its lower end by an annulus or short spacer sleeve 30 of larger diameter than the sleeve 27 and constituting therewith a shoulder 31 and secured as by cotter pin 31ᵃ. Upon the upper spacer sleeve 26 is rotatable and vertically slidable an upper collar 32. The sliding movement of this collar is limited upwardly by the shoulder 29, while downwardly it can slide only far enough to rest against the balls 23ᵃ when the same are closing the upflow passages 23. That is to say, the balls 23ᵃ project sufficiently from recesses 23ᵇ in which they lodge when in closing position, to insure the collar 32 to be spaced a vertical distance D¹ (see Fig. 4) from the piston which distance represents a potential flow passage for the hydraulic fluid to pass through the downflow valve passages 22 in the piston.

Similarly a lower collar 33 underneath the piston is slidable upon the sleeve 27, its sliding movement being limited downwardly by the shoulder 31 and upwardly by its engagement upon balls 22$^a$ closing the downflow passages 22 and projecting from their recesses 22$^b$ in the piston sufficiently to insure the collar 33 to be spaced a vertical distance D$^2$ from the underside of the piston whereby there is insured a flow passage for the hydraulic fluid through the upflow passages 23 of the piston.

An upper coil spring 34 surrounds the piston rod and is confined at its lower end by the collar 32 and its upper end by a piston rod bearing 35 constituting the top closure of an inner or working cylinder 36 in which the piston operates. The spring 34 serves as a control spring for the ball checks 23$^a$ of the upflow passages 23 by its pressure upon the collar 32 in a manner to be further described.

A lower coil spring 37 is confined between the lower collar 33 and a bottom cover or end closure piece 38 of the working cylinder 36. The pressure of this spring upon the lower collar 33 acts as a control for the function of the ball checks 22$^a$ in a manner to be further described.

The end closure piece 38 is provided centrally with a spring pressed ball check valve 39 engaging a downflow or outflow passage 40 through which therefore hydraulic fluid can pass from the working cylinder in one-way fashion. Surrounding the outflow ball check 39 there is provided an annular upflow or inflow passage 41 having a flat annular one-way valve member 42 having a flat annular vertical play in an annular groove 43 surrounding the downflow passage 40. The annular passage 41 together with the annular valve member 42 constitutes a one-way inflow valve for hydraulic liquid to pass into the working cylinder, that is in a direction opposite to the flow of fluid passing through the central downflow passage 40.

The annular outflow and inflow passages 40 and 41 respectively in the end closure piece of the working cylinder serve to pass hydraulic fluid to and from the working cylinder by way of a communicating passage 44 leading from the closure piece 38 to a reservoir 45 sealed against air, represented in this embodiment by the annular space between the inner or working cylinder and an outer or jacket cylinder 46 surrounding the working cylinder. The communicating passage 44 is formed underneath the end closure piece 38 due to spacing portions 38$^a$ constituting part of the closure piece 38 and extending between it and the base member 12 supporting it.

At its bottom end the outer cylinder 46 is fixed to the base member 12 as indicated by a welding seam 47 while its upper end is closed by a top end member or screw cap member 48 engaging the internal thread 49 of the outer cylinder. The piston rod 16 passing through the cap member 48 is sealed by a packing 50 mounted in the cap member and held in place by a packing nut 51 engaging the internal thread 52 provided in the cap member. A spring pressed relief or bleeder ball check valve 53 is also provided in the cap member comprising a ball 53$^a$, a spring 53$^b$ and a spring confining cap screw 53$^c$ having a longitudinal bore 53$^d$ serving as a relief opening.

The lower end of the working cylinder through its end closure piece 38 fits into a depression 54 of the base member 12. A sealing gasket 56 is confined between the cap member 48 and a shoulder represented by a ring 57 inserted into the outer cylinder and in turn resting upon an internal shoulder 58 of the outer cylinder.

The bearing member 35 has an annular groove or depression 35$^a$ at the underside in which may lodge the upper end portion of spring 34, the groove being defined by a central hub portion 35$^b$ and a marginal skirt or ring portion 35$^c$. At the top the bearing member is provided with a depression 35$^d$ from which leads a communicating channel 35$^e$ into the reservoir 45, so hydraulic fluid leaking from the inner cylinder 36 along the bearing faces between piston and bearing member 35 may return to the reservoir.

Figure 1:
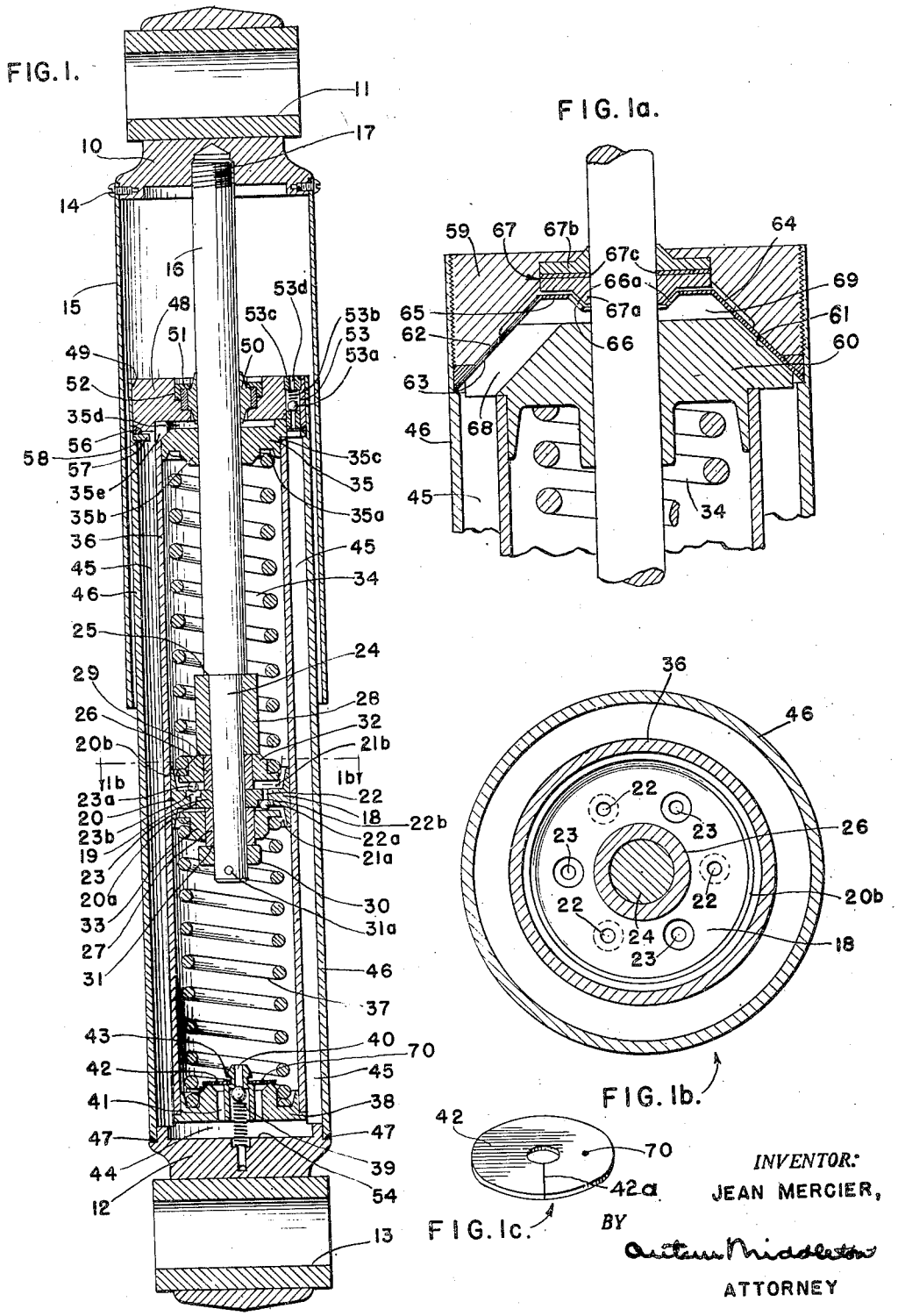

Fig. 1$^a$ shows a modified construction of the piston rod packing or sealing gasket in a cap member 59 closing the outer cylinder 46. A bearing member 60 has an external conical face 61, while the cap member 59 has a complementary internal conical face 62. Interposed and pressure-confined between these two conical faces is an annular gasket supporting hollow member 63 having a conical outer body portion 64, a horizontal top portion 65 and an inverted conical inner portion 66 having radial slots 66$^a$. The portions 65 and 66 engage the under side of a packing ring 67 comprising in fact a pair of component packing rings 67$^a$ and 67$^b$ of symmetrical cross-sections and a stiffener annulus 67$^c$ between them. The supporting member 63 has an aperture (not shown) to accommodate a bleeder valve such as is shown at 53 in the Fig. 1 embodiment. A communicating channel 68 interconnects the reservoir with an annular space 69 underneath the inner portion of the gasket supporting member 63.

I provide a relatively small bleeder passage between that part of the working cylinder that is located below the piston and the reservoir. Such a bleeder passage is shown to consist of a relatively small opening 70 provided in the annular valve member 42 (see the enlarged Fig. 1$^c$). I have found such an opening to function as intended if given about one-fifth ($\frac{1}{5}$) of the diameter of the valve passage 40, for example a valve passage 40 having a diameter of about one-hundred-thousandths ($100/1000$) of an inch, and bleeder opening has a passage having a diameter of about twenty-thousandths ($20/1000$) of an inch.

From Fig. 1$^c$ it can also be seen that the valve disc or flat annulus 42 has a radial slit 42$^a$ enabling it to be deformed in a manner whereby it can be snapped into the annular groove 43.

Operation

The operation of the shock absorber will now be described on the basis of the structural embodiment shown in the drawings.

Figure 3:
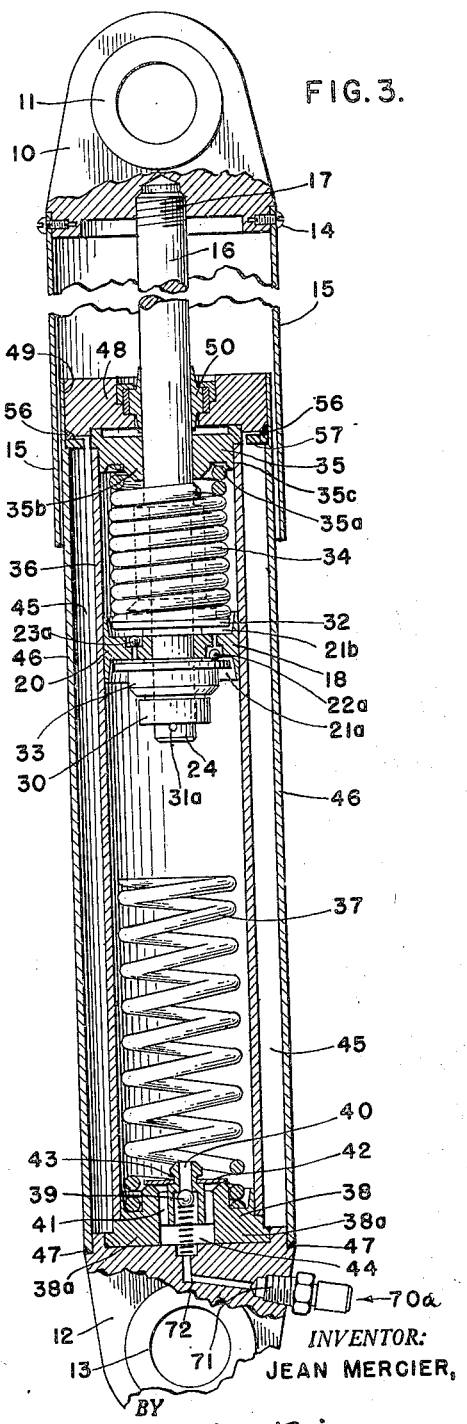
Fig. 3 is another section similar to Fig. 1 of the shock absorber showing the piston substantially at the upper end of its upward shock-initiated stroke.
Figure 4:
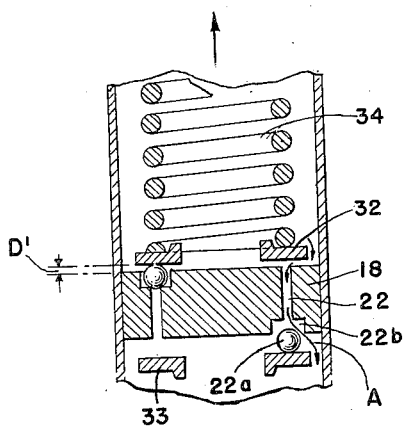
Figs. 4, 5, 6 and 7 are schematic views of various intermediate operating positions characteristic of the operating cycle illustrating the valve function in various phases of the cycle.
Figure 5:
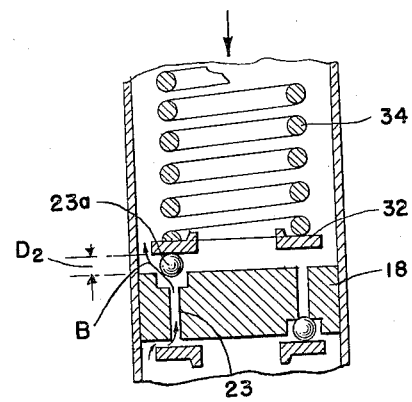

Let us assume that the shock absorber receives an impact causing its extension or lengthening from its neutral (Fig. 1) position followed by a rebound of the piston returning to neutral from its topmost position in the operating cylinder, a condition which might occur when the wheel of an automobile or vehicle passes over a hole in the road. The condition resulting from that kind of an impact is represented in the left-hand half, that is to the left of the vertical main axis of the Fig. 8 diagram. That half of a complete operating cycle of the shock absorber involves the piston valve and spring loading conditions thereof shown in Figs. 4 and 5. Fig. 4 represents a phase or moment in the shock-initiated stroke where the piston moves upward while encountering the low hy- snubbed upward while encountering the low hydraulic resistance such as may be equivalent to say 25# of pressure as is approximately indicated by the line a—b in the diagram. During this upward movement of the piston the spring 34 becomes increasingly compressed, the spring pressure reacting upon the slide ring 32 (see Fig. 4). As the spring continues to be compressed its increasing pressure accumulates upon the ball checks 23a (of which there are three 120° apart) in preparation for their function during the subsequent downward return stroke of the piston. As the piston moves upward, the lower spring 37 dissociates itself from the piston, that is to say from the slide ring 33 as is shown in the Fig. 3 condition of the shock absorber when the piston has reached its topmost position. At maximum compression of the spring 34, the dissociated spring 37 rests entirely untensioned upon the bottom of the operating cylinder. This upward movement of the piston causes the displacement of hydraulic fluid passing from the upper side of the cylinder through the passage defined by the distance or clearance $D_1$ and through and past the now open downflow ball checks 22a against relatively low hydraulic resistance inherent to the ball checks. This transfer of fluid from the upper to the lower side of the piston as indicated by the arrow A, and plotted at about 25# pressure (in Fig. 8) is due to whatever hydraulic flow resistance is offered by the open ball checks 22a in addition to whatever flow resistance is presented to the passage of the fluid from the reservoir 45 through the annular flow valve passage 41 at the bottom of the operating cylinder when a volume of fluid returns from the reservoir equivalent to the diminishing displacement of the extending piston rod 16.

As the piston reverses its direction of travel from its topmost position (indicated at T in the diagram) the pressure encountered by the piston rises abruptly from say 25# to about 600#, since (see Fig. 5) the downflow ball checks 22a now close (there being three of them spaced 120° apart and staggered with the ball checks 23a) due to the change of direction. That is to say, the retransfer of fluid from the underside of the piston to the upper side must now take place if the piston is to descend, through the upflow ball checks 23a by overcoming the accumulated pressure from the compressed spring 34 loading the ball checks 23a. Consequently the rebound or downward return stroke of the piston is dampened or snubbed to the extent that the resistance of the then spring loaded ball checks 23a is being overcome by the fluid being forced upwardly through the suction created above the piston as well as by some degree of resistance offered by the outflow ball checks 39 at the bottom of the operating cylinder. The bottom ball check 39 at this time functions to allow for the return of a volume of fluid to the reservoir 45 that is equivalent to the volume being displaced above the piston by the piston rod 16 being retracted into the cylinder.

As the piston thus returns from its topmost to its neutral position, the resistance of the ball checks 23a to the upward re-transfer of fluid decreases at the rate or substantially in proportion to the rate at which the spring pressure upon the ball checks decreases with a progressive decompression of the spring 34. Hence the hydraulic resistance encountered by the piston on its rebound stroke, that is to say its dampening or snubbing characteristic is represented by the line c—d in the Fig. 8 diagram indicating a pressure- or resistance drop from the 600# maximum value down to about 150#. Accordingly the Fig. 5 operating phase shows the ball of ball checks 23a raised only part of their full lift, that is an intermediate distance $D_2$ between the upper slide ring 32 and the piston, the distance $D_2$ thus being only a portion of the complete sliding movement of the slide ring 32. The upflow re-transfer of fluid from below to above the piston in this manner is indicated by flow arrows B.

Figure 2:
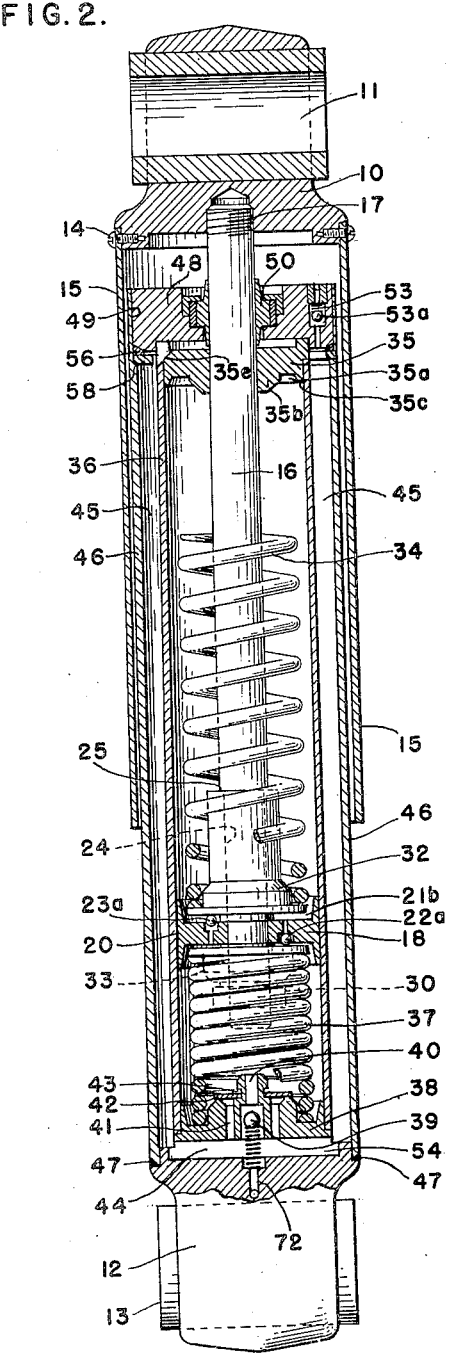
Fig. 2 is a similar section, to that in Fig. 1, of the shock absorber showing the piston substantially at the lower end of its downward shock-initiated stroke.
Figure 6:
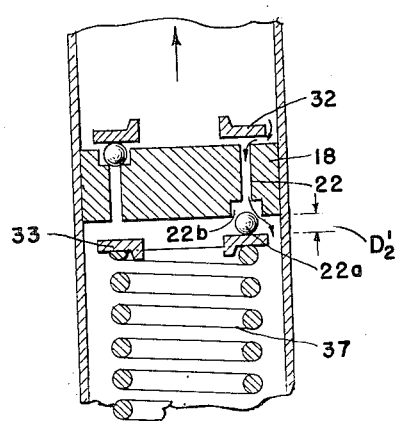
Figure 7:
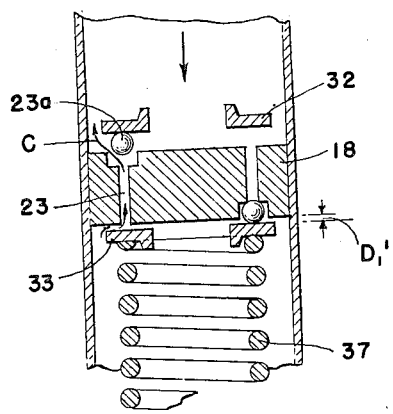

In order to complete the operating cycle of the shock absorber, let us now assume that the shock absorber structure receives an impact causing its contraction or foreshortening from its neutral position, as might occur when a wheel of an automobile or vehicle equipped with this shock absorber passes over a hump on the road. The resulting condition is represented in the right hand half, that is to the right of the vertical main axis of the Fig. 8 diagram. This second half of the complete operating cycle involves the piston valve and spring loading conditions shown in Figs. 6 and 7. Fig. 7 represents a phase in the shock-initiated stroke when the piston moves from its neutral position substantially unsnubbed downward encountering a steady hydraulic resistance equivalent to say 150# as indicated by the line d—e in the Fig. 8 diagram. This resistance or pressure is due to whatever moderate flow resistance is offered by the upflow ball checks 23a to the transfer of fluid from the underside to the topside of the piston, in addition to whatever resistance may be due to the downflow through the bottom check valve 39 and into the reservoir 45 of a fluid volume equivalent to the volume being displaced by the retracting piston rod. As the piston on its shock-initiated stroke moves down toward its lowermost (Fig. 2) position indicated by point L of the Fig. 8 diagram, the fluid passes (see flow arrow C) through the passage defined by space $D_1'$ and through the upflow ball checks 23a. Simultaneously the lower spring 37 is being compressed and attains its maximum compression at the lowermost point of piston travel whereby it exerts a corresponding loading pressure upon the ball checks 22a in preparation for the upward return or rebound stroke of the piston. From Fig. 2 it will be seen that during this unsnubbed down-stroke the upper spring 34 is wholly untensioned as it travels bodily down with the piston detaching itself from the top end of the operating cylinder.

As the piston reverses its direction of travel to enter upon its snubbed or dampened upward return stroke, the resistance pressure rises again abruptly to say 600# at point $f$ in the Fig. 8 diagram since the ball checks 23b (see Fig. 7) now close and the fluid to be re-transferred from the top side to the underside of the piston must overcome the pressure from spring 37 loading the ball checks 22a. However, as the piston progresses upwardly and back towards the neutral position, the spring pressure diminishes substantially in proportion, and in proportion therewith also diminishes the resistance pressure offered to the re-transfer of the fluid from the top side to the under side of the piston. Hence, Fig. 6 shows the ball checks 22a only part way open as indicated by the distance $D_2'$ between the lower slide ring 33 and the piston, the distance $D_2'$ representing only part of the complete sliding movement of the ring 33. The snubbing or dampening characteristic of this rebound stroke is therefore indicated by the line f—a in the diagram showing that the snubbing effect decreases substantially at the rate at which the piston again approaches its neutral (Fig. 1) position.

The adjustment and function of the ball check 53 in the piston rod bearing member 48 is such as to allow excess fluid or fluid under excess pressure to escape therethrough from the reservoir 45. A filling connection for hydraulic liquid is shown at 70a comprising an inlet plug connection 71 leading into a passage 72 extending first at a moderate upward incline and then vertically into the communicating passage 44 leading to the reservoir.

While structural conditions may require the shock absorber of this invention to be placed in other than vertical positions, the embodiment herein illustrated shows the vertical position as a preferred one. While the piston actuating means may assume other forms, for example a form that has no piston rod but a shock-actuated rocker member engaging the piston laterally through an opening in the wall of the working cylinder, I have nevertheless illustrated an embodiment in which a piston rod actuates the piston. The embodiment illustrated requires compensating means such as a reservoir for absorbing the differential of hydraulic fluid due to the variations in volumetric displacement of the moving piston rod. The springs which actuate the fluid transfer check valves in the piston may assume other forms than the one shown, as the structural face of the mechanical embodiment changes. However, in the preferred form shown the springs are compression coil springs substantially concentric with the axis of the working cylinder. As for the inflow and outflow check valves for absorbing the volumetric differential of piston-rod displacement as well as differentials of hydraulic fluid due to thermal expansion of the hydraulic fluid it may be desirable to have a construction in which the inflow check valve is at one end and the outflow check valve is at the other end of the working cylinder, yet the preferred embodiment illustrated shows the inflow as well as the outflow valve both disposed at the same end of the working cylinder. The outflow valve is shown spring-pressed by a coil spring but obviously another kind of valve and/or spring could be used such as a finger spring. And whereas in the example given herein pressures of 25#, 150# and 600# have been mentioned, obviously the apparatus can be designed readily to give or respond to other pressures as occasion requires.

I have found it to be advantageous to provide a relatively small bleeder passage 70 between that part of the working cylinder that is located below the piston and the reservoir. The advantage of its function lies in the fact that during the total retraction stroke c—d—e of the piston rod (see diagram Fig. 8) at low piston rod speed the action of the shock absorber is thereby reduced to (dotted line) pressure condition c—d'—e'.

The function is that at high piston rod speeds the relative effect of this bleeder opening 70 will become negligible. That is to say, at low speed the bleeding will be effective and operate to modify the pressure characteristic in the diagram, whereas at high speeds the bleeding effect will automatically become ineffective.

According to operating requirements it may be desirable to have the coil springs 34 and 37 in neutral position untensioned or to have them pre-loaded or slightly compressed. The functional result of a pre-loaded condition of these springs is a correspondingly greater snub effect within a narrow range about a neutral position.

I claim:

1. A hydraulic astatic shock absorber comprising a working cylinder and an encircling cylinder surrounding the working cylinder and providing an oil reservoir therebetween, a base member connected with the encircling cylinder and also carrying the working cylinder, a piston motivating rod for the working cylinder and provided with a piston, a top end member closing the upper end of the encircling cylinder and through which said piston rod slidably extends in sealing relationship therewith, said working cylinder being confined between said base and said top end member, two sets of oil passages through the piston through which oil may pass upwardly or downwardly, upper valve means on the upper face of the piston for one set of said oil passages to check downward oil flow therethrough, lower valve means on the lower face of the piston for the other set of said oil passages, upper spring means to check upward oil flow therethrough confined and compressible between said upper valve means and the upper end portion of the working cylinder for loading the upper valve means with a pressure that is variable as a function of piston travel between neutral and above-neutral piston position, lower spring means confined and compressible between said lower valve means and the lower end portion of the working cylinder for loading the lower valve means with a pressure that is variable as a function of piston travel between neutral and below-neutral piston position, said two sets of valve means with their associated spring means together with said check-valved inflow and outflow passages all being coactive to allow for a shock-initiated movement of the piston from neutral position in either upward or downward direction in which the movement of the piston is relatively unsnubbed during its stroke from neutral position and is snubbed at a variable rate which decreases as a function of travel of the piston during its return stroke to neutral position.

2. A shock absorber according to claim 1, in which the working cylinder has at its upper end a piston rod bearing member, and a chamber is provided between said top end member and said piston rod bearing member, having a communicating passage with said reservoir.

3. A shock absorber according to claim 1, wherein at least one set of valve means comprises a plurality of more than two ball checks, and an annular member engaging said ball checks and spaced from said piston to provide an oil flow passage between it and the piston at all times, which annular member is subjected to the pressure of the associated spring means.

4. A shock absorber according to claim 1, wherein at least one set of valve means comprises a plurality of more than two ball checks, and an annular member engaging said ball checks and having a flat face bearing on said ball checks and spaced from the piston to provide an oil flow passage between said flat face and the piston at all times, which annular member is subjected to the pressure of the associated spring means.

5. A shock absorber according to claim 1, wherein at least one set of valve means comprises a plurality of three ball checks substantially equidistantly spaced from one another, and an annular member engaging said ball checks and spaced from said piston to provide an oil flow passage between it and the piston at all times, which annular member is subjected to the pressure of the associated spring means extending thereto from the adjacent end of the working cylinder.

6. A shock absorber according to claim 1, with the addition of a relatively narrow bleeder passage effective between that part of the working cylinder that is located below the piston, and the reservoir.

7. A shock absorber according to claim 1, in which the inflow check valve means comprise a non-restrained plate member having a relatively narrow bleeder opening provided therein.

8. Apparatus according to claim 1, wherein the inflow check valve means comprise a non-restrained plate member having a relatively narrow bleeder opening provided therein, and wherein the outflow check valve means comprise a spring-pressed ball check.

9. A shock absorber according to claim 1, in which the inflow oil passage leading from the cylinder is centrally disposed in said base member and has a spring-pressed check member associated therewith, and the outflow oil passage leading to the cylinder surrounds the central inflow oil passage and is provided with an annular check member.

JEAN MERCIER.

REFERENCES CITED

The following references are of record in the file of this patent:

UNITED STATES PATENTS

| Number | Name | Date |
| --- | --- | --- |
| 1,281,079 | Sears | Oct. 8, 1918 |
| 1,444,248 | Hofmann | Feb. 6, 1923 |
| 2,018,312 | Moulton | Oct. 22, 1935 |
| 2,138,513 | Rossman | Nov. 29, 1938 |
| 2,360,755 | Boor | Oct. 17, 1944 |